United States Patent [19]

Lentz et al.

[11] Patent Number: 5,439,095
[45] Date of Patent: Aug. 8, 1995

[54] APPARATUS FOR SERIALLY CONVEYING RECEPTACLE LIDS

[75] Inventors: Norbert Lentz, Essen; Karl-Heinz Witt, Recklinghausen, both of Germany

[73] Assignee: Krupp Maschinentechnik Gesellschaft mit beschränkter Haftung, Essen, Germany

[21] Appl. No.: 200,496

[22] Filed: Feb. 23, 1994

[30] Foreign Application Priority Data

Feb. 27, 1993 [DE] Germany .............. 43 06 110.9

[51] Int. Cl.$^6$ .................................. B65G 47/04
[52] U.S. Cl. ................. 198/480.1; 198/483.1
[58] Field of Search .............. 198/418.3, 479.1, 480.1, 198/481.1, 482.1, 483.1

[56] References Cited

U.S. PATENT DOCUMENTS

| | | | |
|---|---|---|---|
| 2,602,533 | 7/1952 | Bruce . | |
| 2,687,202 | 8/1954 | Nordquist et al. | 198/482.1 X |
| 3,687,261 | 8/1972 | Guckel | 198/480.1 |
| 3,687,285 | 8/1972 | Messeruey | 198/482.1 X |
| 5,046,599 | 9/1991 | Hamano | 198/481.1 |

FOREIGN PATENT DOCUMENTS

| | | |
|---|---|---|
| 1267652 | 4/1963 | Germany . |
| 3141364 | 10/1981 | Germany . |
| 3838007 | 11/1988 | Germany . |
| 4127702 | 8/1991 | Germany . |

Primary Examiner—D. Glenn Dayoan
Attorney, Agent, or Firm—Spencer, Frank & Schneider

[57] ABSTRACT

An apparatus for serially conveying receptacle lids includes two lid-advancing wheels each having a plurality of circumferentially spaced peripheral pockets for receiving individual lids. The wheels peripherally adjoin one another in a border zone for transferring the lids from one wheel to the other. The apparatus further has a supporting surface situated underneath the wheels for supporting the lids as the lids are advanced by the wheels. An annular guide surrounds the wheels externally of the border zone for retaining the lids in the wheel pockets. A pin is mounted on at least one of the wheels at one of the pockets thereof; the pin is held displaceably relative to the wheel carrying the pin. Further, the pin has an upper position for engaging a radially inner part of a shoulder of the lid to retain the lid in the pocket adjoining pin. Further, the pin has a lower position for releasing the lid shoulder to allow a displacement of the lid relative to the pocket. A control device displaces the pin during rotation of the wheels.

5 Claims, 6 Drawing Sheets

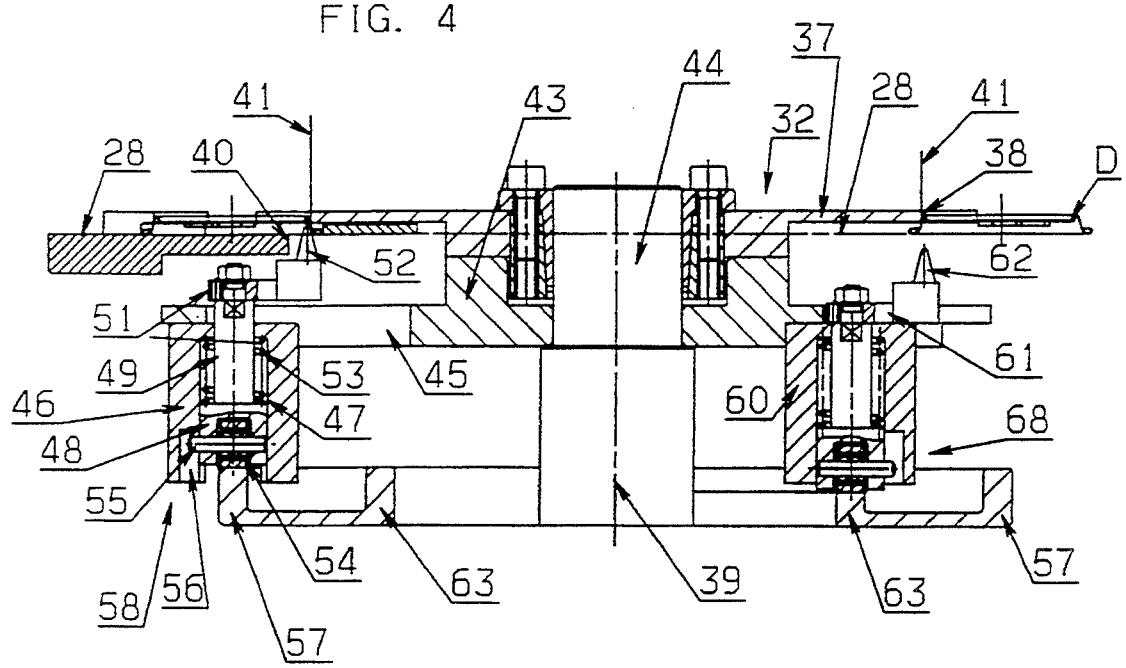
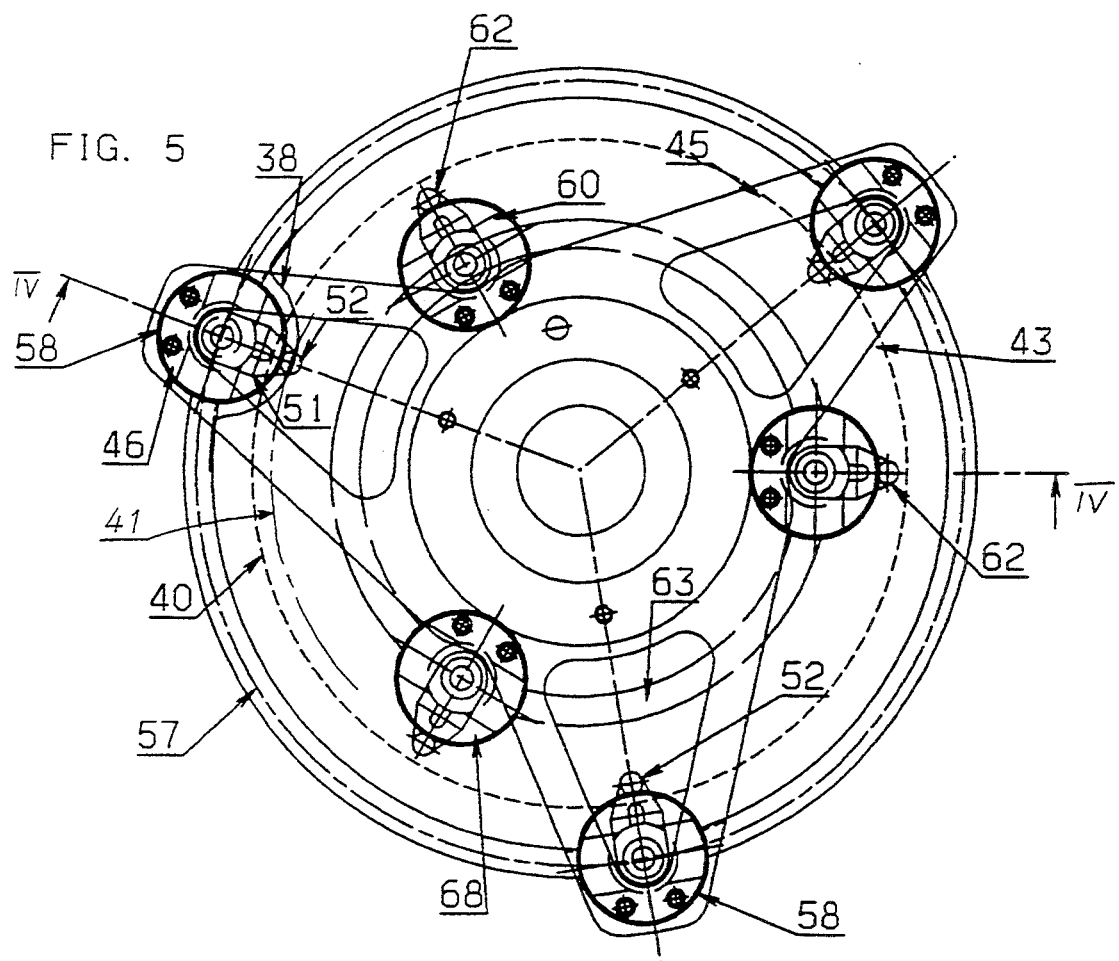

APPARATUS FOR SERIALLY CONVEYING RECEPTACLE LIDS

CROSS REFERENCE TO RELATED APPLICATION

This application claims the priority of German Application No. P 43 06 110.9 filed Feb. 27, 1993, which is incorporated herein by reference.

BACKGROUND OF THE INVENTION

This invention relates to an apparatus for serially conveying receptacle lids (such as can lids) and is of the type that has a plurality of conveying wheels provided with pockets (compartments) to advance lids for the purpose of combining several lid series into a single lid series or to separate a single lid series into several lid series. The wheels may also be designated as "star wheels" or "stars" in case the compartments are uniformly arranged along the wheel circumference. The apparatus is further provided with a support or guide surface on which the lids are supported by their downwardly oriented shoulders. The wheels are surrounded by annular guides which retain the lids in the wheel pockets and which are discontinued in the region where two wheels adjoin.

The machines of the manufacturing line for making cans and can lids have, as a rule, unlike output rates (number of items per time unit). When arranging such machines serially, it is economically sensible to combine the lid series or lid sequence from machines of smaller output rate, for example, lid rolling machines into a single lid series for the further processing in a machine of higher output rate, for example, an automated testing or sealant applying (gumming) machine. Conversely, it is likewise practical to divide a single lid series into a plurality of lid series.

In conventional apparatus of the above type the lids made of tinned sheet-iron are retained in the wheel pockets by magnets against the effects of centrifugal forces in those zones where the annular guides have to be discontinued, for example, in the lid transfer zone where the lids pass directly from the pockets of one wheel into the pockets of an adjoining wheel.

SUMMARY OF THE INVENTION

It is an object of the invention to provide an improved apparatus of the above-outlined type with which the lid series may be combined or separated independently of their magnetic properties. The apparatus according to the invention is particularly adapted to handle lids made of aluminum.

This object and others to become apparent as the specification progresses, are accomplished by the invention, according to which, briefly stated, the apparatus for serially conveying receptacle lids includes two lid-advancing wheels each having a plurality of circumferentially spaced peripheral pockets for receiving individual lids. The wheels peripherally adjoin one another in a border zone for transferring the lids from one wheel to the other. The apparatus further has a supporting surface situated underneath the wheels for supporting the lids as the lids are advanced by the wheels. An annular guide surrounds the wheels externally of the border zone for retaining the lids in the wheel pockets. A pin is mounted on at least one of the wheels at one of the pockets thereof; the pin is held displaceably relative to the wheel carrying the pin. Further, the pin has an upper position for engaging a radially inner part of a shoulder of the lid to retain the lid in the pocket adjoining pin. Further, the pin has a lower position for releasing the lid shoulder to allow a displacement of the lid relative to the pocket. A control device displaces the pin during rotation of the wheels.

By virtue of the invention, non-ferromagnetic lids may be grasped provided they have a circumferential flange extending from the lid plane. Thus, the invention may be utilized not only in the handling of can lids but also in the handling of other items, such as closures for glass receptacles. The flange-like (shoulder-like) configuration need not necessarily be along the periphery of the lid; rather, it may be situated radially inwardly of such periphery.

The control of the pins is, according to a preferred embodiment, effected by means of cam tracks arranged about the rotary axis of the star wheel. It is also feasible, however, to use controllable pneumatic cylinders or plunger solenoids. Advantageously, the control cam track—as viewed in a direction parallel to the rotary star wheel axis—is arranged concentrically about the rotary axis and further, the pins may be linearly (particularly vertically) height-adjustable to ensure an accurate engagement with the lid shoulders.

In the zone where two star wheels adjoin and where thus the otherwise present annular lid guide is discontinued, the pins of the receiving star wheel have to be situated at the contact point of the pitch circles of both wheels in their upper, lid-engaging position. For such star wheels which receive the lids in a selective manner, it is of particular advantage to arrange the pins for swinging motion in an imaginary plane containing the rotary axis of the wheel. In such a case, the control cam track has different radii from the rotary axis of the wheel, and the points of the pins are upwardly pivoted on a circular curve. By virtue of this arrangement the pins may move past underneath the lid shoulders and may be pivoted upwardly until engagement with the lid shoulders occurs.

BRIEF DESCRIPTION OF THE DRAWINGS

FIG. 4 is a sectional view taken along line IV—IV of FIG. 5.

FIG. 5 is a fragmentary top plan view of a separating star wheel incorporating a preferred embodiment of the invention.

DESCRIPTION OF THE PREFERRED EMBODIMENTS

Figure 1:
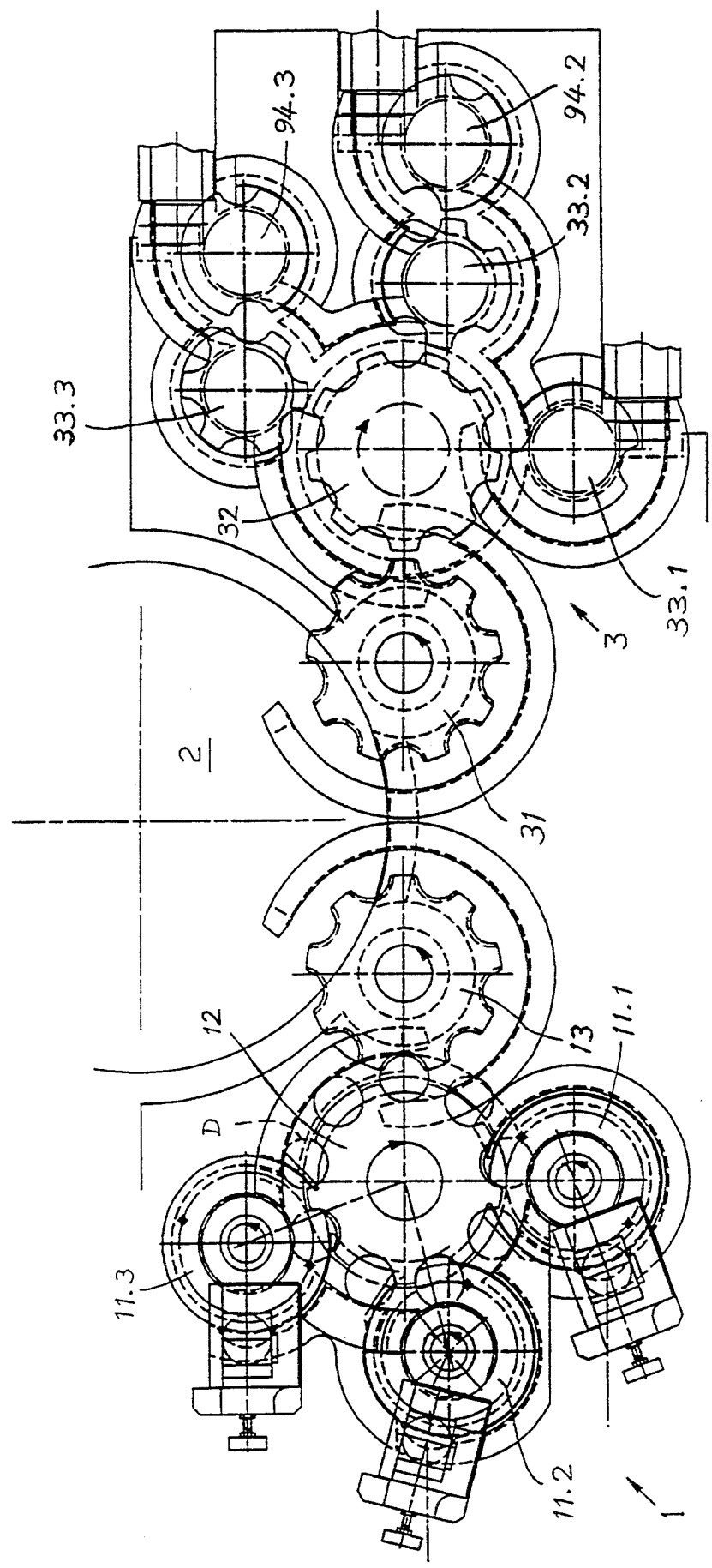
FIG. 1 is a top plan view of an apparatus incorporating the invention.

Turning to FIG. 1, the apparatus shown therein includes a device 1 for combining can lids D from three separate series into a single series which is admitted for processing into a sealant applying machine 2 (or automatic testing machine). The apparatus further has a device 3 for separating a single lid series discharged by the gumming machine 2 into three separate lid series.

Figure 2:
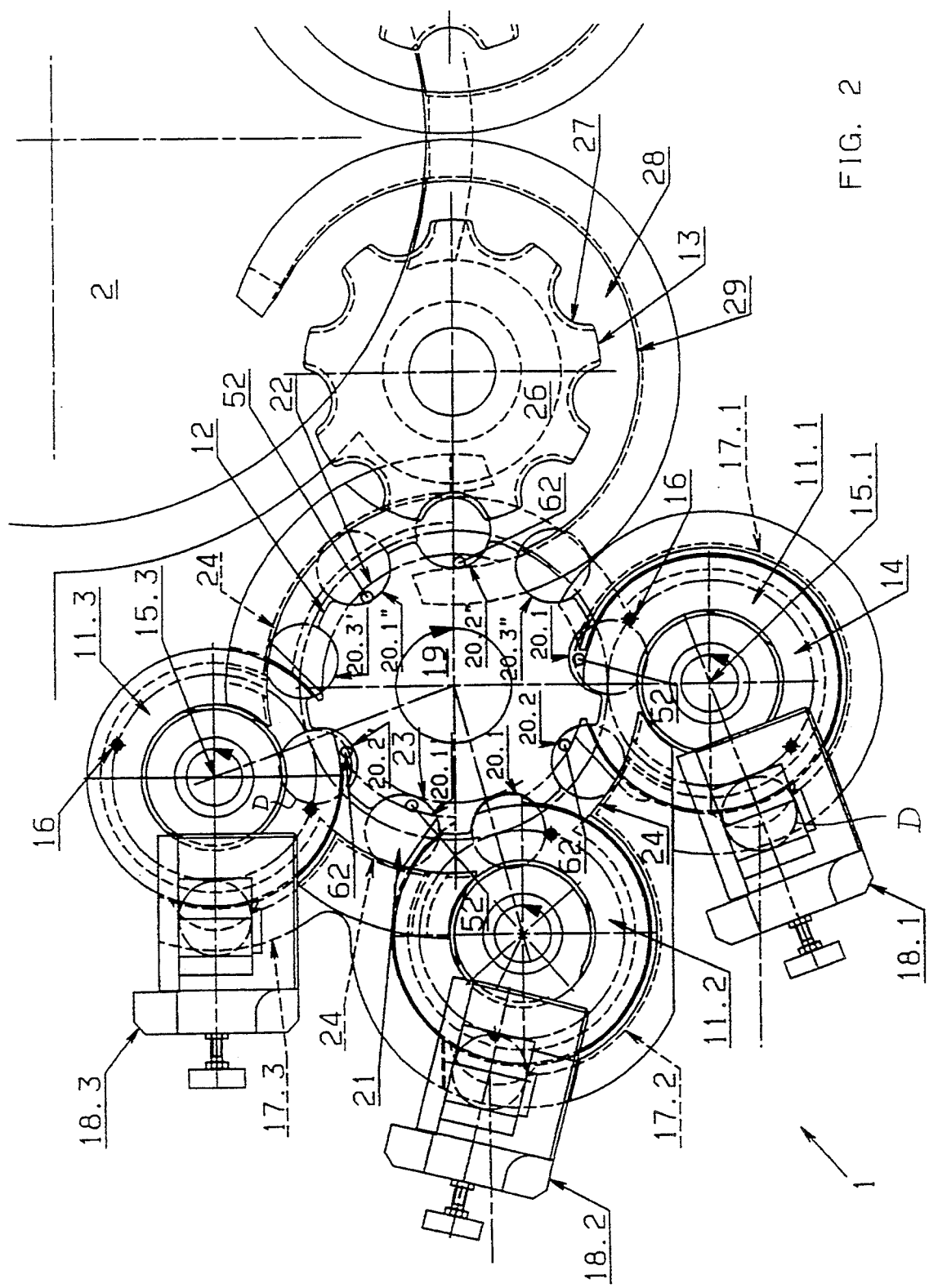
FIG. 2 is a top plan view, on an enlarged scale, of one part of the structure shown in FIG. 1 for combining several lid series into a single lid series.

Referring to FIG. 2, the device 1 has three supply wheels 11.1, 11.2 and 11.3 (generally also designated as 11.n, where n=1, 2, 3), a combining star 12 and a takeover star or, with regard to the sealant applying machine 2, an inlet star 13. The supply wheels 11.1, 11.2 and 11.3 are arranged circumferentially about the rotary axis of the combining star 12 and are grouped on one side of the combining star 12 and are spaced at 80° to one another. The first supply wheel 11.1 and the takeover star 13 form a circumferential angle of 270° with the rotary axis of the combining star 12.

The supply wheels 11.1, 11.2 and 11.3 are flat discs 14 which include two carrier pins 16 arranged parallel to their respective rotary axes 15.1, 15.2 and 15.3. The supply wheels 11.n are surrounded along their circumference by a fixed guide 17.n (n=1, 2, 3) for the lids D. The supply wheels 11.n cyclically receive a lid D from their respective associated lid suppliers 18.1, 18.2, 18.3. The lid D is engaged by one of the carrier pins 16 and entrained thereby as the respective supply wheel 11.n rotates. The guides 17.n extend—as viewed in the direction of rotation of the wheels 11.n—from the lid supplier 18.n to the combining star 12. The supply wheels 11.n, the lid suppliers 18.n and the guides 17.n are known elements of conventional apparatus.

The combining star 12 has a rotary disc 19 having nine pockets or compartments 20 (20.1, 20.2, 20.3, 20.1', 20.2', 20.3', 20.1", 20.2" and 20.3"). Immediately underneath the disc 19 a guide track (lid supporting track) 21 is situated on which the lids D may glide with their inner side oriented upwardly and with their shoulders engaging the guide track 21. The guide track 21 is provided with a circular opening 22 arranged coaxially with the combining star 12. The guide track 21 is at the same height as the discs 14 of the wheel 11.n and is interrupted (discontinuous) in their region. The inner diameter of the opening 22 is greater than the inscribed circle 23 which is tangent to each pocket 20.

The guide track 21 is surrounded by an outer annular guide 24 which is interrupted (discontinuous) in the zone of the supply wheels 11.n. The inner diameter of the guide 24 is essentially by two lid diameters greater than the diameter of the circle 23 tangent to the pockets 20.

In order to guide the lids D securely against the effect of centrifugal forces even in the zone from which the outer guide 24 is absent, the combining star 12 is, at the pockets 20.1, 20.1', 20.1" and 20.2, 20.2' as well as 20.2" provided with respective, height-controllable pins 52 and 62, whose radial distance from the rotary axis of the combining star 12 is greater than one-half the diameter of the circle 23 and smaller than one-half the inner diameter of the opening 22 of the guide track 21. In the zone of the pockets 20.3, 20.3' and 20.3" no pins are provided because the outer guide 24 is not interrupted between the supply wheel 11.3 and the takeover star 13. The remaining structure of the combining star 12 together with the height-controllable pins 52, 62 and their function will be described later in conjunction with the separating star 32 also to be described below.

The takeover star 13 is constituted by a disc 26 which has at its circumference nine recesses or pockets 27 adapted to the shape of the can lids D. Immediately underneath the disc 26 there is situated a lid guiding or supporting surface 28 which has the same height as the guide track 21 and the upper surface of the supply wheels 11.n and is formed partially as a one-piece component with the guide track 21. About the takeover star 13 there is provided an outer annular guide 29 which extends from the combining star 12 continuously to the gumming machine 2.

The gumming machine 2 and the transfer of the lids D from the takeover star 13 to the gumming machine 2 are conventional components and functions.

Figure 3:
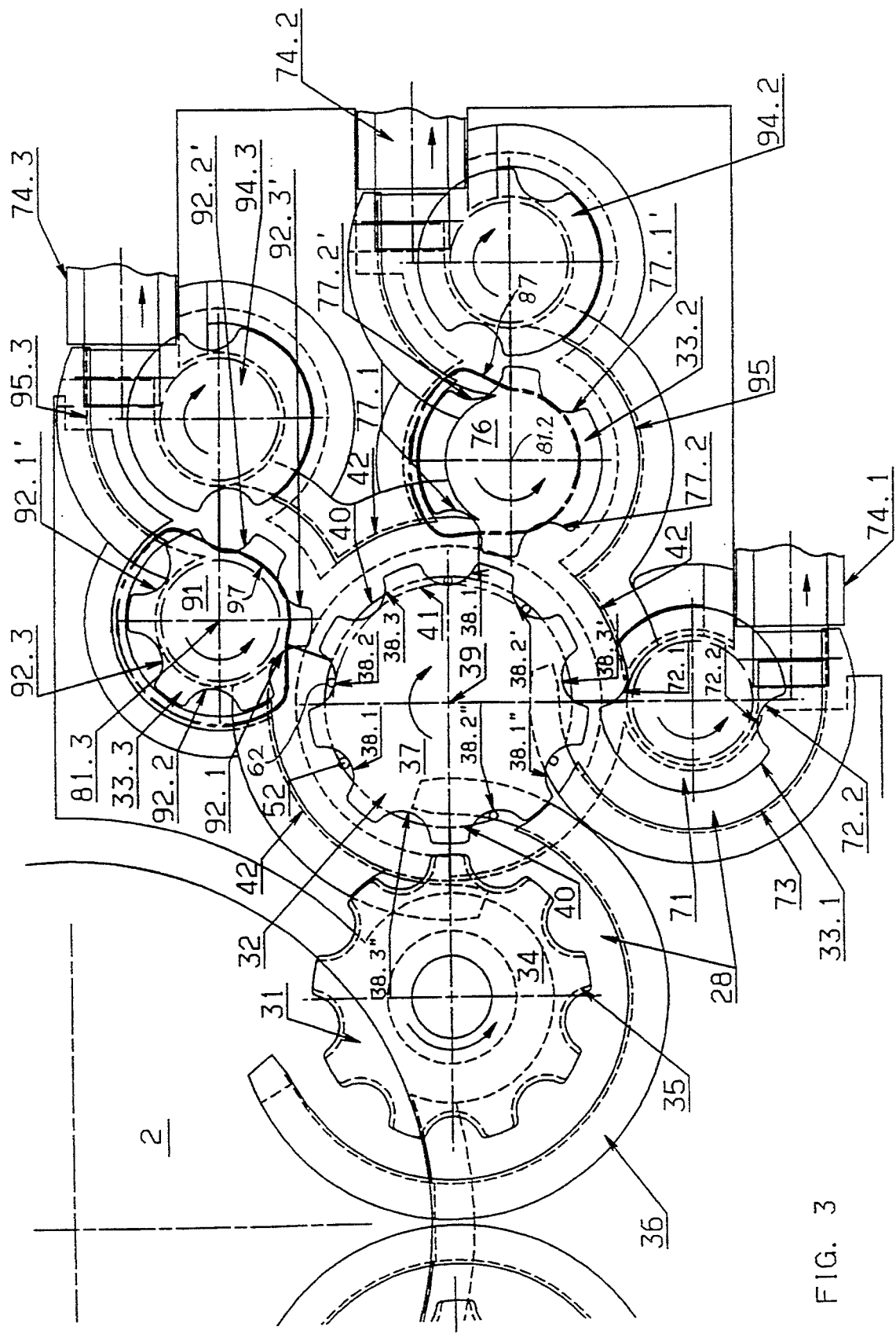
FIG. 3 is a top plan view, on an enlarged scale, of another part of the construction shown in FIG. 1, for the separation of a single lid series into a plurality of lid series.

Turning to FIG. 3, the device 3 for dividing (separating) a single lid series discharged by the gumming machine 2, into a plurality of lid series has a dispensing or outlet star 31, a separating star 32 and three receiving wheels 33.1, 33.2 and 33.3 (also designated generally as 33.n, wherein n=1, 2, 3) arranged about the separating star 32, as shown in FIG. 3. The reference numerals for the receiving wheels 33.1, 33.2 and 33.3 are arranged in an increasing order as viewed in a direction opposite the rotary direction of the separating star 32.

The dispensing star 31 includes a disc 34 which has at its circumference nine recesses or pockets 35. Immediately underneath the disc 34 there is situated a guide track (supporting surface) 28 for the lids D. About the dispensing star 31 an outer, annular guide 36 is arranged which leads without interruption from the gumming machine 2 to the separating star 32.

The separating star 32 has—similarly to the combining star 12—a rotary disc 37 with nine cutouts or pockets 38 (38.1, 38.2, 38.3, 38.1' ... , 38.2', ... ) adapted to the shape of the lids. Immediately underneath the disc 37 there is situated the guide track 28 which has a circular opening 40 arranged concentrically to the rotary axis 39 of the separating star 32 and whose inner diameter is greater than the inscribed circle 41 arranged tangentially to the pockets 38.

Receiving wheels 33.1, 33.2 and 33.3 are arranged about the separating star 32; the numbering thereof increases in a direction opposite to the direction of rotation of the separating star 32. An annular guide 42 extends from the dispensing star 31 to the last receiving wheel 33.1. The annular guide 42 is disposed about the separating star 32 and is discontinued in the zone of the first two receiving wheels 33.3 and 33.2.

Also referring to FIGS. 4 and 5, the disc 37 of the separating star 32 is, together with a three-arm carrier body 43, secured to the drive shaft 44 of the separating star 32 rotating about the rotary axis 39. A guide housing 46 is secured to each arm 45 of the carrier body 43 in an orientation parallel to the rotary axis 39. The arms 45 and the guide housings 46 are—as viewed parallel to the rotary axis 39—spaced at 120° from one another.

Each guide housing 46 has a hollow cylindrical guide surface 47 in which a sliding body 48 is guided parallel to the rotary axis 39. The sliding body 48 is at its top provided with a guide rod 49 to which there is affixed an arm 51 which is oriented towards the rotary axis 39 and to which there is secured an upwardly conically tapering pin 52. The sliding body 48 and thus the pin 52 are urged downwardly by a spring 53 surrounding the guide rod 49.

In the sliding body 48 a follower roller 54 is supported on a pin shaft 55 which at one end is guided in a groove 56 arranged parallel to the rotary axis 39 of the separating star 32 for the purpose of maintaining unchanged the angular position of the pin 52 relative to the separating star 32.

The follower roller 54 is in engagement with a stationary cam track 57 which, as viewed parallel to the rotary axis 39, has an annular configuration. The above-described components 46–49, 51, 53 and 54 form a height control device for the pin 52 and form a unit therewith, generally designated at 58.

On the carrier body 43 between the arms 45, at an angular division of 40° and, respectively, 80° at a small radial distance from the rotary axis 39 three further guide housings 60 are arranged in which in a like manner there is height-adjustably guided an arm 61 which is oriented away from the rotary axis 39 and which is provided with an upwardly conically tapering pin 62. The height change of the pins 62 is effected by a further inner control cam track 63 which—as viewed parallel to the rotary axis 39—is coaxial with the control cam track 57. These control devices, together with their associated pins 62, are constructed identically to the control devices 58 and are, as a unit, designated with the reference numeral 68.

The radial distance of all pins 52 and 62 from the rotary axis 39 is identical. Such distance is less than half the diameter of the annular opening 40 (and the annular opening 22) and is greater than half the diameter of the circle 41 of the separating star 32 (and one-half the diameter of the circle 23 of the combining star 12). The combining star 12 and the separating star 32 have identical structures.

The control cam tracks 57, 63 and the corresponding control cam tracks associated with the combining star 12 are always in the high position and thus the pins 52 and 62 of the separating star 32 and the combining star 12 are always lifted when there is a discontinuity in the lid-retaining guide 24 or 42 and a lid D has to be held in the respective star pocket 20 or 38.

The pins 52 of the outer control devices 58 of the combining star 12 and the separating star 32 are provided for grasping and firmly holding those lids which arrive from the supply wheel 11.1 and which are received by the receiving wheel 33.1. The pins 62 of the inner control devices 68 are provided for grasping and firmly holding those lids which arrive from the supply wheel 11.2 and are taken over by the receiving wheel 33.2.

For those lids which arrive from the supply wheel 11.3 and are transferred to the receiving wheel 33.3 there are no controllable holding pins necessary at the combining star 12 and the separating star 32, because the outer guide 24 disposed about the combining star 12 extends continuously from the supply wheel 11.3 to the takeover star 13 and the outer guide 42 passes through from the dispensing star 31 to the receiving wheel 33.3. Stated differently, these guides have no discontinuity and thus the lids are securely guided along their path.

The receiving wheel 33.1 is arranged immediately above the guiding surface 28 and is formed as a simple disc 71 having two diametrically oppositely located pockets 72.1 and 72.2. About the receiving wheel 33.1 there is provided an outer guide 73 for the lids. At that side of the receiving wheel 33.1 which is remote from the separating star 32 there is arranged a vacuumized conveyor belt 74.1 which tangentially leads away from that side and whose upper run lies at the height of the guiding surface 28. The outer guide 73 extends from the separating star 32 to the conveyor belt 74.1.

The receiving wheel 33.2 includes a rotary disc 76 provided with four pockets 77.1, 77.2, 77.1' and 77.2' which are arranged on the disc circumference at 60° and, respectively, 120° from one another.

Figure 6:
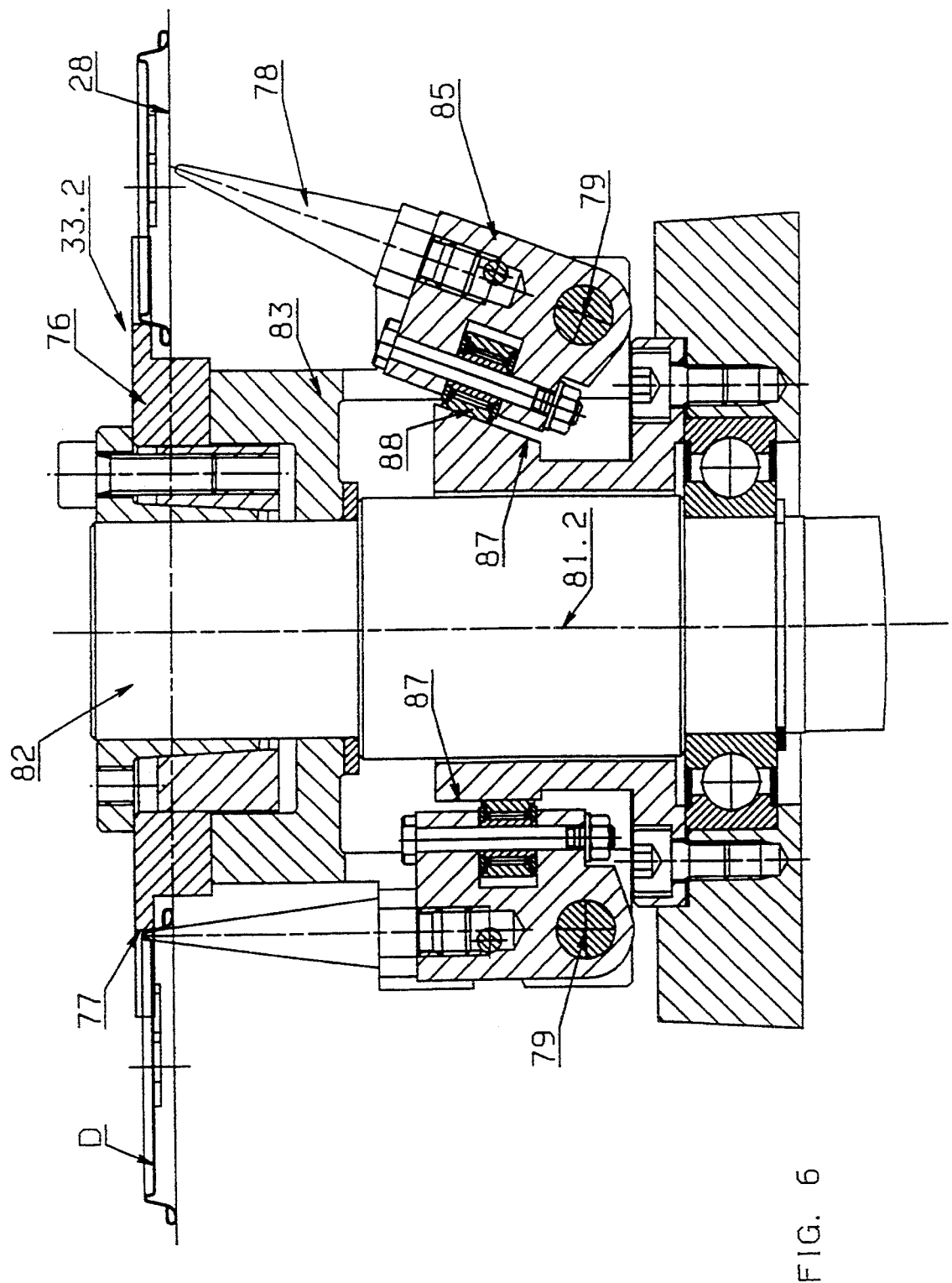
FIG. 6 is an axial sectional view of a receiving wheel forming a part of the apparatus shown in FIG. 3 and illustrating another preferred embodiment of the invention.
Figure 7:
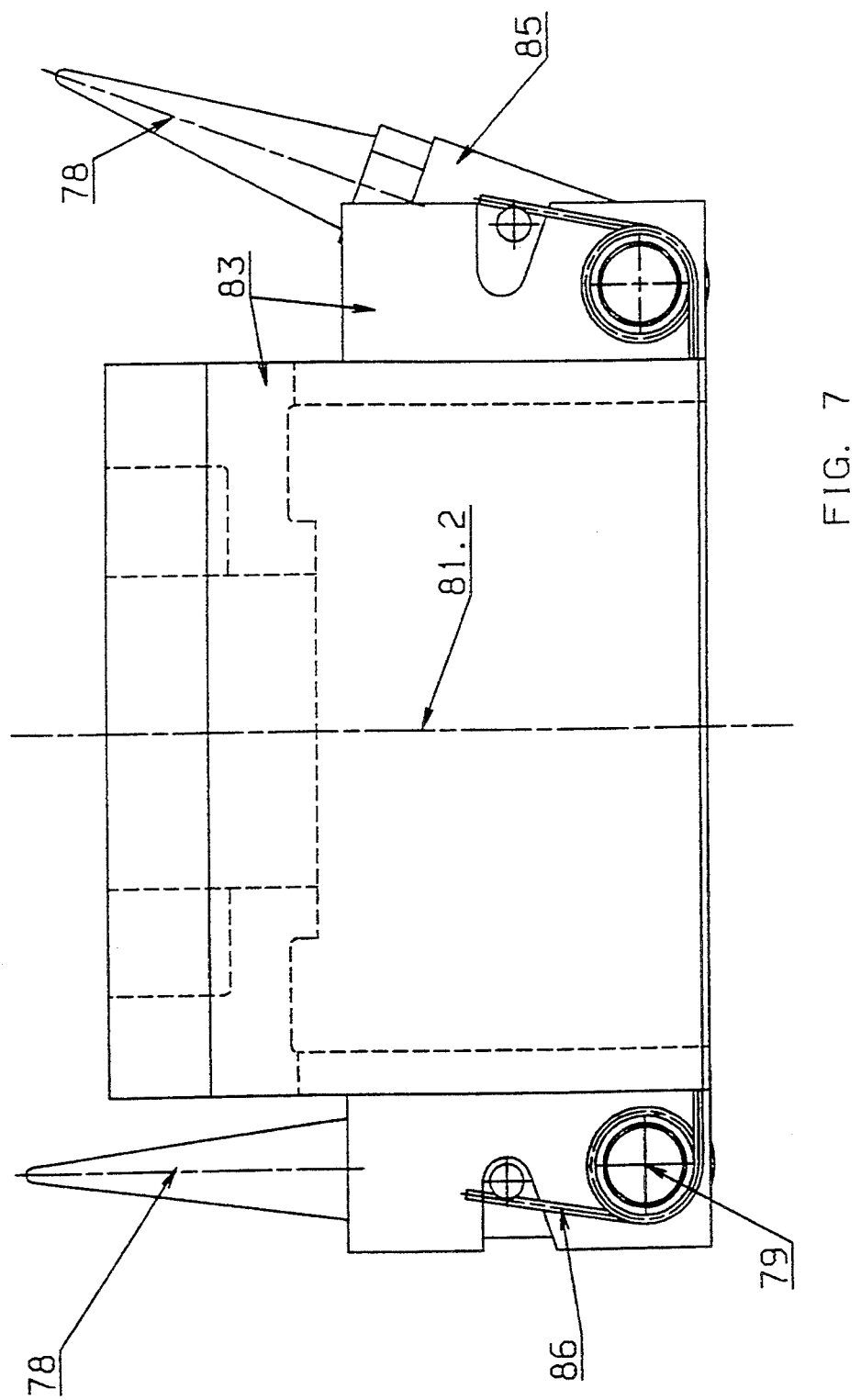
FIG. 7 is a side elevational view of the structure of FIG. 6.

Also referring to FIGS. 6 and 7, the receiving wheel 33.2 further has two pins 78 which are pivotal about a respective horizontal shaft 79 situated underneath the guide plane 28. The horizontal shafts 79 are oriented perpendicularly to the rotary axis 81.2 of drive shaft 82 and are supported in a holder 83. The drive shaft 82, the disc 76 and the holder 83 form a rotating unit. The pins 78 are pivotal in a plane which contains the rotary axis 81.2 and which passes through the center of the pockets 77.2 and 77.2'.

The pins 78 are secured to a pin holder 85 which is pivotal about the axis of shafts 79. A bent spring 86 biases the pin holder 85 and thus the pin 78 in the direction of the rotary axis 81.2.

The pivotal angle of each pin 78 is determined by a fixed control cam track 87 which is arranged around the drive shaft 82. Each pin holder 85 engages the control cam track 87 with the intermediary of a follower roller 88. The shape of the control cam 87 is seen in FIGS. 3 and 6.

The receiving wheel 33.3 is structured identically to the receiving wheel 33.2 except that the rotary disc 91 of the receiving wheel 33.3 has six circumferentially uniformly distributed pockets 92.1, 92.2, 92.3, 92.1', 92.2' and 92 3' and the two pins 78 are arranged to be pivotal in a plane passing through the pockets 92.3 and 92.3'.

Downstream of the receiving wheels 33.2 and 33.3—as viewed in the direction of can lid advance—respective disc-shaped belt-transfer wheels 94.2 and 94.3 are arranged, each having an outer guide 95.2 and 95.3, respectively. Respective conveyor belts 74.2 and 74.3 extend parallel to the conveyor belt 74.1 and lead away from the belt-transfer wheels 94.2 and 94.3.

Corresponding to the other angular arrangement of the belt-transfer wheel 94.3 to the separating star 32 relative to the rotary axis 81.3, the control cam track 97 of the receiving wheel 33.3 and associated with the belt-transfer wheel 94.3 is designed with such a course that it has, in comparison with control cam track 87 of receiving wheel 33.2 associated with belt-transfer wheel 94.2, a longer path along which the pins 78 are depressed.

All wheels and stars as well as the sealant applying machine 2 are connected operationally to one another in such a manner that their circumferential speeds at their pitch circles or along the lid path, respectively, are identical.

In the description which follows, the operation of the above-described apparatus will be set forth.

The lid suppliers 18.n cyclically advance lids D to the supply wheels 11.n. The lids fall—in an orientation such that their inner face is oriented upwardly—with their shoulder flanges onto the wheel disc 14 and are carried by the pins 16 in the circumferential direction of the wheels 11.n. In this operation the lids D are held in their travelling path by the outer guides 17.n.

In the operational description which follows, by cycling time there is meant the time T needed for two consecutive lids held, for example, in the takeover star 13, to pass the same location.

The starting of the apparatus proceeds as will be described below. For the sake of simplicity, it is assumed that, unlike the arrangement shown in FIG. 2, the lid suppliers 18.n are arranged diametrically opposite the combining star 12 as related to the rotary axes 15.n of the associated supply wheels 11.n.

Time t=T: the lid supplier 18.1 places a lid onto the supply wheel 11.1.

Time t=2T: the lid supplier 18.2 places a lid onto the supply wheel 11.2.

Time t=3T: the lid supplier 18.3 places lid onto the supply wheel 11.3

Time t=4T: the supply wheel 11.1 has, since time t=T, turned one half revolution and transfers the originally inserted lid into the pocket 20.1 of the combining wheel 12. Simultaneously, from the lid supplier 18.1 the second lid is placed onto the supply wheel 11.1.

Time t=5T: the combining star 12 has in the last cycling time executed a revolution of 40° and its pocket 20.2 is facing the supply wheel 11.2. The lid which was placed onto the supply wheel 11.2 at t=2T is now taken over by the combining star 12 and further conveyed.

Time t=6T: the combining star 12 has rotated through a further 40° and its pocket 20.3 is now facing the supply wheel 11.3. In this position the lid placed onto the supply wheel 11.3 by the lid supplier 18.3 at time t=3T is transferred to the combining star 12 and a new lid is placed by the lid supplier 18.3 onto the supply wheel 11.3.

Time t=7T: the second lid placed by the lid supplier 18.1 onto the supply wheel 11.1 is taken over by the combining star 12 and a third lid is placed onto the supply wheel 11.1 by the lid supplier 18.1.

Time t=8.75T: the first lid received from the supply wheel 11.3 is transferred from the pocket 20.3 to the takeover star 13; one period later the lid received from the supply wheel 11.2 is transferred to the takeover star 13 from the pocket 20.2 and in a successive period later, at t=10.75T the lid received from the supply wheel 11.1 is transferred from the pocket 20.1 to the takeover star 13, and so on.

To ensure that the lids taken over from the supply wheel 11.1 can be securely held in the pockets 20.1, 20.1' and 20.1" of the combining star 12 even as the continuity of the guide 24 is interrupted by peripheral portions of supply wheels 11.2 and 11.3, the outer control cam track 57 (FIGS. 4 and 5) of the combining wheel 12 has such a course that the pins 52 are moved, even prior to the interruption (discontinuity) of the outer guide 24 by the supply wheel 11.2 into their upper position in which the pins 52 hold the lids from the inside at their shoulders, as shown at the left-hand part of FIG. 4. Similarly, the inner control cam track 63 has a rising slope between the supply wheel 11.2 and the supply wheel 11.3 so that the pins 62, before they arrive at the beginning of the discontinuity of the outer guide 24 by the supply wheel 11.3, are moved into their upper position in which the pins 62 hold the lids at their shoulders. Both control cam tracks 57 and 63 drop prior to reaching the takeover star 13 to such an extent that the pins 52 and 62, respectively, free the lids as shown at the right-hand side of FIG. 4.

The takeover star 13 receives all the lids from the combining star 12 and transfers them to the gumming machine 2. From the latter all the lids are taken over by the dispensing star 31 which, in turn, transfers the lids to the separating star 32.

The control cam tracks 57 and 63 associated with the separating star 32 have between the dispensing star 31 and the receiving wheel 33.3 such a rising slope that the pins 52, 62 arrive into their upper position and the lids in the pockets 38.1, 38.1', 38.1" and 38.2 and 38.2' and 38.2" are held in the earlier-described manner against the separating star 32.

No pins are associated with pockets 38.3, 38.3' and 38.3". The lids situated in these pockets are grasped by the pins 78 of the receiving wheel 33.3 and are held thereby until the lids are taken over by the belt-transfer wheel 94.3. At the location of transfer the lids are freed by virtue of the pins 78 pivoting away therefrom. In this manner one third of the lids is advanced with the intermediary of the belt-transfer wheel 94.3 onto the vacuum conveyor belt 74.3 and carried away thereby.

The inner control cam 63 has a falling slope ahead of the receiving wheel 33.2 so that the pins 62 are withdrawn from the lids. Conversely, the pins 78 of the receiving wheel 33.2 grasp the lids and hold them in the pockets 77.2 and 77.2', respectively, until they are taken over by the belt-transfer wheel 94.2.

The height of the outer control cam track 56 decreases after the discontinuity (caused by the receiving wheel 33.1) of the outer guide 42, so that the pins 52 are withdrawn from the lids and these thus may then be taken over the receiving wheel 33.1.

It will be understood that the above description of the present invention is susceptible to various modifications, changes and adaptations, and the same are intended to be comprehended within the meaning and range of equivalents of the appended claims.

What is claimed is:

1. In an apparatus for serially conveying receptacle lids; each lid having a peripheral shoulder; the apparatus including two lid-advancing wheels each having a plurality of circumferentially spaced peripheral pockets for partially accommodating individual lids therein; said wheels being supported for rotation in a substantially horizontal plane; said wheels peripherally adjoining one another in a border zone for transferring the lids from the pockets of one of said wheels to the pockets of another of said wheels;

a supporting surface situated underneath said wheels for supporting the lids by the shoulders thereof as the lids are advanced by said wheels;

a separate annular guide surrounding said wheels externally of said border zone for retaining the lids in respective said pockets externally of said border zone;

the improvement comprising (a) a pin mounted on at least one of said wheels at one of the pockets thereof; said pin being held displaceably relative to the wheel carrying said pin; said pin having an upper position for engaging a radially inner part of the lid shoulder to retain the lid in the pocket adjoining pin; said pin having a lower position for releasing the lid shoulder to allow a displacement of the lid relative to said pocket; and (b) control means for displacing said pin during rotation of said wheels.

2. The apparatus as defined in claim 1, wherein said one wheel has a rotary axis and wherein said control means comprises (a) a cam track disposed about said rotary axis; and (b) a follower mounted on said pin and running on said cam track upon rotation of said one wheel for displacing said pin relative to said one wheel as a function of a course of said cam track.

3. The apparatus as defined in claim 2, wherein said cam track is coaxial with said rotary axis as viewed in a direction parallel to said rotary axis; said cam track changing axial position along said rotary axis; said pin being supported for linear displacements parallel to said rotary axis.

4. The apparatus as defined in claim 2, further comprising means for supporting said pin for pivotal motion in a plane containing said rotary axis; said cam track changing radial positions relative to said rotary axis as viewed circumferentially thereabout.

5. The apparatus as defined in claim 1, wherein said pin has a conically tapering free end.

* * * * *